United States Patent [19]

Takase et al.

[11] Patent Number: 4,991,026
[45] Date of Patent: Feb. 5, 1991

[54] CHROMINANCE SIGNAL REPRODUCING APPARATUS FOR VIDEO TAPE RECORDER

[75] Inventors: Osamu Takase; Hikaru Masui, both of Yokohama; Shigeyuki Itoh, Katsuta; Yoshizumi Watatani, Fujisawa, all of Japan

[73] Assignee: Hitachi, Ltd., Tokyo, Japan

[21] Appl. No.: 243,849

[22] Filed: Sep. 13, 1988

[30] Foreign Application Priority Data

Sep. 21, 1987 [JP] Japan .................. 62-234884

[51] Int. Cl.$^5$ ............................................. H04N 9/79
[52] U.S. Cl. ..................................... 358/328; 358/329
[58] Field of Search ............... 358/324, 318, 323, 147, 358/21 V, 10, 19, 25, 326, 330, 335, 328, 340, 329, 327; 360/33.1, 37.1, 26, 27, 28, 38.1

[56] References Cited

U.S. PATENT DOCUMENTS

| | | | |
|---|---|---|---|
| 3,315,028 | 4/1967 | Kool | 358/26 |
| 4,400,742 | 8/1983 | Yamamitsu et al. | 358/318 |
| 4,477,831 | 10/1984 | Hosoya | 358/26 |

FOREIGN PATENT DOCUMENTS

| | | | |
|---|---|---|---|
| 105123 | 10/1975 | Japan | 358/328 |
| 48919 | 3/1978 | Japan | 358/328 |

Primary Examiner—Robert L. Richardson
Attorney, Agent, or Firm—Antonelli, Terry, Stout & Kraus

[57] ABSTRACT

A magnetic recording and reproducing apparatus for eliminating the crosstalk component from an adjacent track of a tape of a VTR and obtaining a high picture quality. Chrominance signals in the base band which are produced by a low frequency conversion chroma signal are supplied to comb-shaped filters which are used in the magnetic recording and reproducing apparatus. The chrominance signals in the base band are obtained by generating carriers synchronized with a burst signal of the low frequency conversion chroma signal including the jitter component upon reproduction and by multiplying the carriers and the low frequency conversion chroma signal. A burst signal portion between the resultant chrominance signals in the base band is applied as a frequency control input signal to an oscillator as the carrier generating source, so that desired carriers are derived. Thus, the frequency fluctuation is eliminated from the converted chrominance signal in the base band and the high picture quality can be realized.

10 Claims, 4 Drawing Sheets

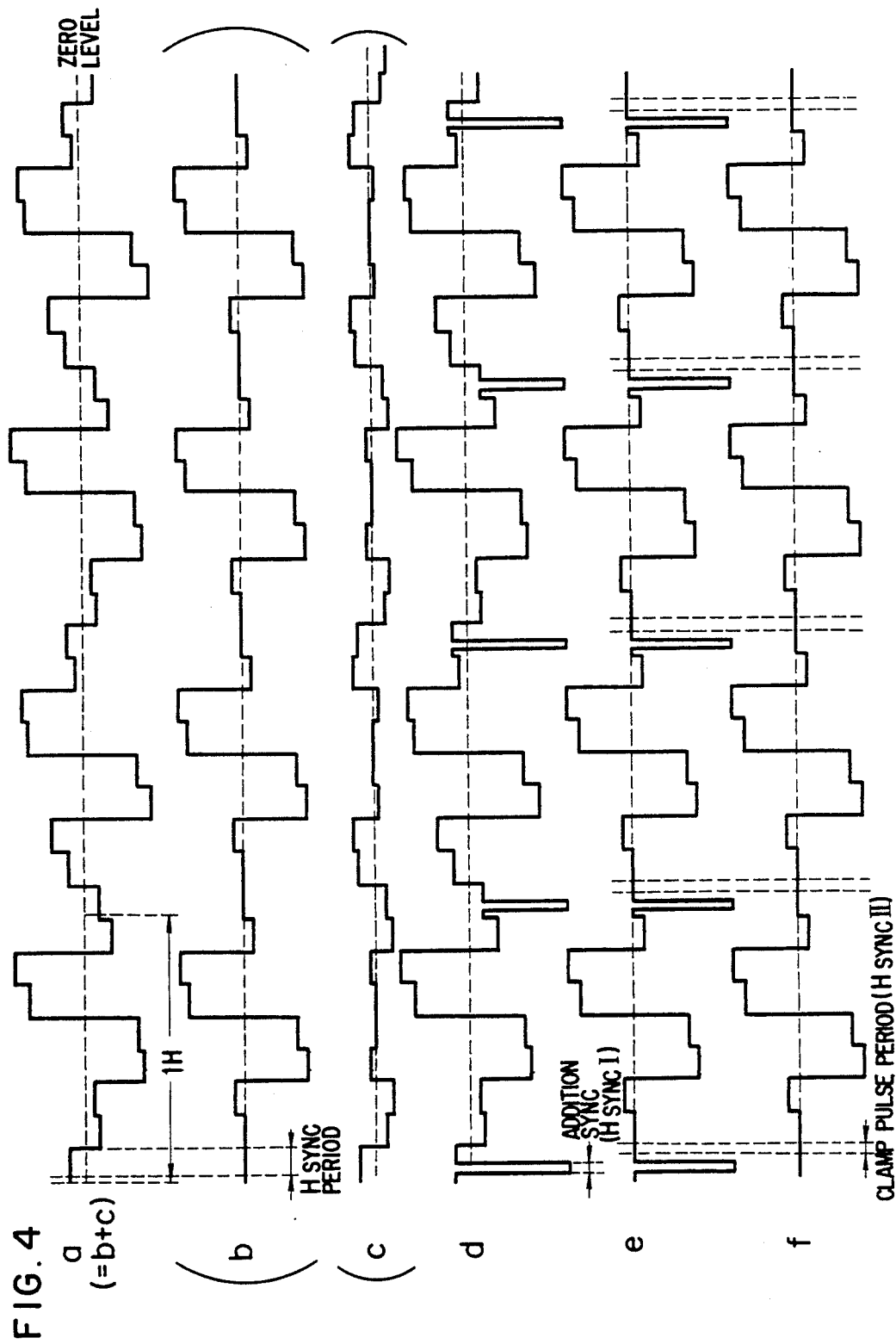

CHROMINANCE SIGNAL REPRODUCING APPARATUS FOR VIDEO TAPE RECORDER

BACKGROUND OF THE INVENTION

The present invention relates to a magnetic recording and reproducing apparatus and, more particularly, to improve the picture quality by enabling the crosstalk components from the adjacent tracks which leak to a chroma signal on a certain recording track to be extremely preferably eliminated and to provide means which is useful for making it possible to eliminate the guard band on the recording track (high density recording).

In a two-head helical scan type VTR, in order to eliminate the guard band on a recording track and to realize the high density recording, it is necessary to suppress the crosstalk components from the adjacent tracks and to assure a good S/N ratio. For this purpose, the recording azimuth angles of the adjacent tracks are made different and the components of the adjacent tracks are suppressed by the azimuth loss, thereby realizing the high S/N ratio.

The azimuth loss depends on the recording frequency and a sufficiently large effect can be obtained with respect to a frequency modulated luminance signal in a relatively high frequency band. However, the effect is inadequate for a low frequency conversion chroma signal in a relatively low frequency band.

That is, since the luminance signal is written at a relatively high frequency, no crosstalk occurs. However, since the chroma signal is written at a relatively low frequency, there is a fear of generation of crosstalk. Therefore, the invention intends to eliminate the crosstalk regarding the chroma signal.

According to the conventional techniques, with respect to the low frequency conversion chroma signal, the frequencies for the tracks are interleaved such that the difference between the recording frequencies of the adjacent tracks is set to a value which is an odd-number times as large as $\frac{1}{2} f_H$ (in the case of the NTSC system), and in the reproducing mode, the adjacent components are eliminated by using a 1 H comb-shaped filter (H indicates one horizontal scan period). This technique has been disclosed in JP-A-53-105123 (JP-B-58-55719) and JP-A-52-48919.

That is, the invention disclosed in JP-A-53-105123 (JP-B-58-55719) relates to a recording and reproducing method of an information signal. According to this method, when a periodic information signal is recorded onto and reproduced from adjacent tracks, it is recorded so that the phase of the information signal is relatively inverted at every predetermined period of the adjacent tracks in the recording mode, and the interference from the adjacent track is eliminated on the basis of the inversion relation of the phases of the reproduced information signals in the reproducing mode.

Further, the invention set forth in JP-A-52-48919 relates to a recording and reproducing system of a color video signal. According to this system, a carrier chrominance signal separated from a color video signal is frequency converted into a low frequency signal and recorded onto a recording medium, the phase of the low frequency conversion carrier chrominance signal to be recorded is shifted in a predetermined direction by an angle of about 90° at a time at every horizontal scan period, the phase shifting directions on the adjacent recording tracks are made different, and the low frequency conversion carrier chrominance signal is recorded, thereby eliminating the crosstalk of the low frequency conversion carrier chrominance signal between the adjacent recording tracks.

Each of the foregoing conventional techniques requires the very high accurate specification with respect to the delay time of a delay line which is used in the comb-shaped filter. A very small delay time difference causes the comb-shaped characteristics to be fairly deteriorated. Thus, there are problems such that the picture quality is deteriorated and the elimination of the guard band on the recording track (i.e., high density recording) cannot be accomplished.

SUMMARY OF THE INVENTION

It is a main object of the present invention to eliminate the crosstalk components from the adjacent tracks which leak to a chroma signal on a recording track without requiring a high accuracy to a delay time of a delay line which is used in a comb-shaped filter and to prevent the deterioration of the picture quality of a magnetic recording and reproducing apparatus.

Another object of the invention is to realize the high picture quality in a magnetic recording and reproducing apparatus by suppressing the residual time base fluctuation component.

These objects are directly accomplished by using a chrominance signal in a base band which is produced from the low frequency conversion chroma signal and which is not used in the conventional techniques instead of using the low frequency conversion chrominance signal itself as a signal which is supplied to a comb-shaped filter consisting of a charge transfer device (hereinafter, also referred to as a CCD (Charge Coupled Device)) or the like. However, the R-Y and B-Y components of the chrominance signal in the base band cause the carriers which are synchronized with a burst signal of the low frequency conversion chroma signal including the jitter component in the reproducing mode and are obtained by multiplying the carriers and the low frequency conversion chroma signal. Therefore, the problems will be substantially solved if desired carriers are certainly obtained by applying the burst signal portion in the resultant chrominance signal in the base band as a frequency control input to an oscillator serving as a carrier generating source.

The R-Y and B-Y components of the chrominance signal in the base band exist in the band of about 0 to 500 kHz and this band is as low as about 1/7 to the ordinary chroma signal frequency of 3.58 MHz±500 kHz. Even when the delay times which are necessary in the addition (subtraction) of the delay signal and the non-delay signal to obtain the comb-shaped characteristic are matched, the accuracy of 1/7 is enough. Therefore, for the same delay time difference, in the case of the chrominance signal in the base band, the phases can be made coincident at a high accuracy in the above addition (subtraction), the comb-shaped characteristic can be improved, and the suppressing performance of the adjacent crosstalk component is also improved. On the other hand, in order to make the comb-shaped filter effectively function, it is necessary that no frequency fluctuation occurs in the base band chrominance signal as a signal which passes through this filter. Although the reproduced low frequency conversion chroma signal includes the jitter component, by applying the burst signal portion of the R-Y component of the converted base band chrominance signal as an oscillating frequency control input to an original oscillator to generate conversion carriers, the conversion carriers which follow the reproduced low frequency conversion chroma signal can be generated. Thus, the frequency fluctuation is eliminated from the converted base band chrominance signal.

BRIEF DESCRIPTION OF THE DRAWINGS

Preferred embodiments of the present invention will now be described in conjunction with the accompanying drawings, in which:

FIG. 4, (consisting of (a=b+c), (b,(c, and d-f, is a signal waveform diagram in each section of the embodiment of FIG. 3.

DESCRIPTION OF THE PREFERRED EMBODIMENTS

Figure 1:
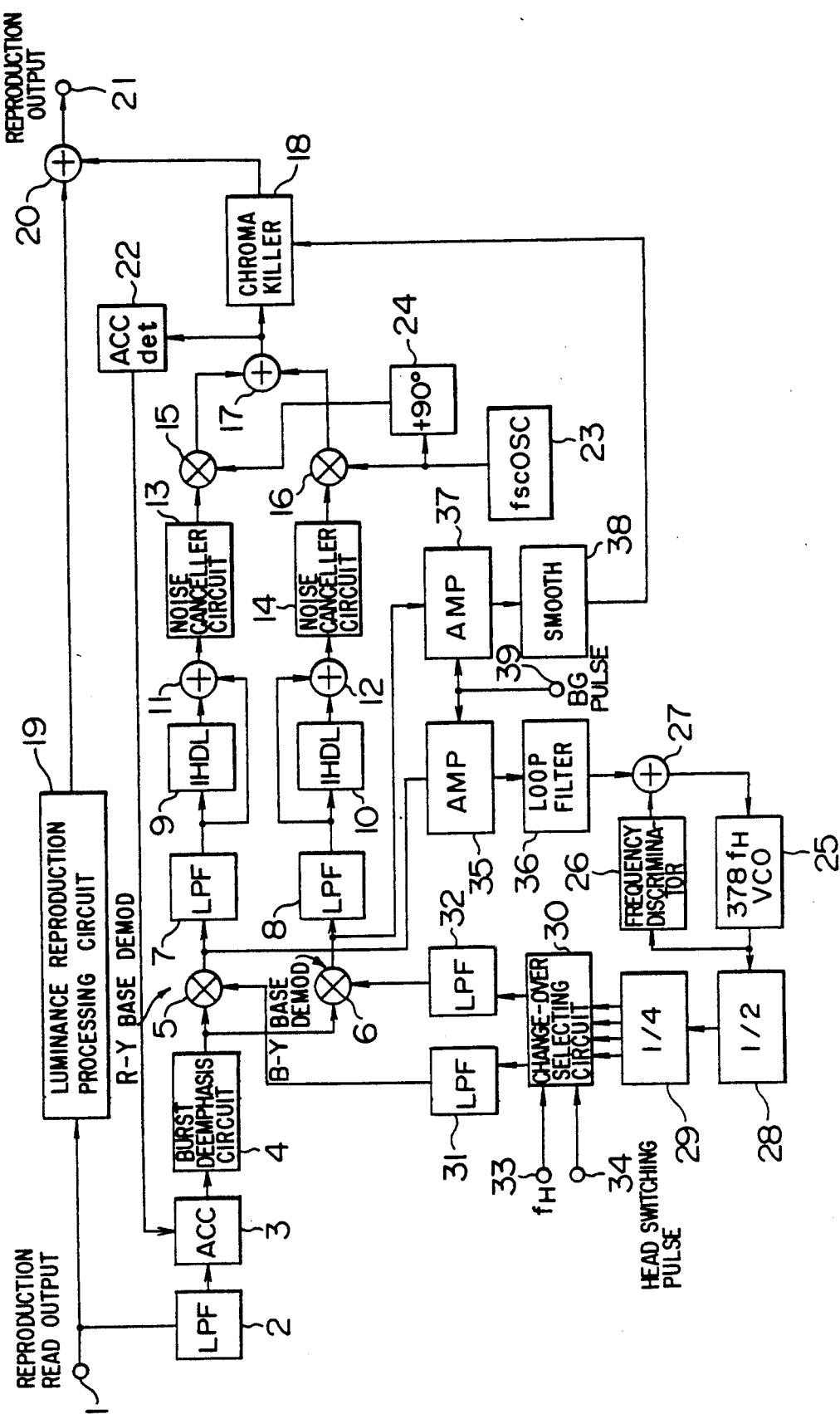
FIG. 1 is a block diagram showing an embodiment of a magnetic recording and reproducing apparatus according to the present invention.

An embodiment of a magnetic recording and reproducing apparatus according to the present invention will be described hereinbelow with reference to FIG. 1. In FIG. 1, reference numeral 1 denotes an input terminal to which a reproduction head output is supplied through a preamplifier (not shown); 2 indicates a low pass filter (hereinafter, referred to as an LPF) for allowing a low frequency conversion chroma signal to pass; 3 an automatic chroma level control circuit (hereinafter, referred to as an ACC circuit) for absorbing a level fluctuation of a reproduction chroma signal; 4 a burst deemphasis circuit to return a color burst signal emphasized in the recording mode to the original level; 5 and 6 frequency converters (hereinafter, referred to as converters); 7 and 8 LPFs whose pass bands are set to about 0 to 500 kHz; 9 and 10 delay circuits each having a delay time of one horizontal scan period; 11 and 12 adders; 13 and 14 noise canceller circuits; 15 and 16 converters; 17 an adder; 18 a chroma signal cut-off circuit (hereinafter, referred to as a chroma killer); 19 a luminance reproduction processing circuit including a frequency demodulator, a deemphasis circuit, and the like; 20 an adder; 21 an output terminal of the reproduction chroma signal; 22 an ACC detecting circuit for generating a control voltage to the ACC circuit 3; 23 an oscillator of a color subcarrier frequency ($f_{sc}$); 24 a+90° phase shifting circuit; 25 a voltage controlled oscillator (hereinafter, referred to as a VCO) having a center frequency of 378 $f_H$ ($f_H$ is a horizontal scan frequency); 26 a frequency discriminator for suppressing an output of the VCO 25 of the frequency of 378 $f_H$ to a frequency of, e.g., 378 $f_H \pm 2$ $f_H$; 27 an adder; 28 a ½ frequency dividing circuit; 29 a ¼ frequency dividing circuit; 30 a change-over selecting circuit; 31 and 32 LPFs each having a pass band of a low frequency conversion chroma frequency ($f_{Lsc}$); 33 an input terminal of an $f_H$ pulse; 34 an input terminal of a head switching pulse; 35 and 37 amplifiers; 36 a loop filter; 38 a smoothing circuit; and 39 an input terminal of a burst gate (BG) pulse.

The operation of the first embodiment will now be described. Only the low frequency conversion chroma signal (240 kHz to 1.24 MHz) in the reproduction head output which is supplied to the terminal 1 is taken out by the LPF 2. Next, the level fluctuation or the like between channels due to the head characteristic is absorbed by the ACC circuit 3. Further, the burst signal emphasized in the recording mode is returned to the original level by the burst deemphasis circuit 4. The output signal of the burst deemphasis circuit 4 is supplied to the converters 5 and 6. Carriers $\phi_1$ and $\phi_2$ of the low frequency conversion chroma frequencies are input to the converters 5 and 6, respectively. The carriers $\phi_1$ and $\phi_2$ include the similar jitter component (time base fluctuation component) to the output of the burst deemphasis circuit 4 and their phases are selected by the change-over selecting circuit 30 so as to return the phase rotation (the horizontal scan period H is set to a unit and certain phases are given in accordance with a predetermined order) to the original rotation upon recording. The carriers $\phi_1$ and $\phi_2$ are generated by the operation, which will be explained hereinbelow.

First, a multiplication output of the carrier $\phi_1$ and the output of the burst deemphasis circuit 4 is derived from the converter 5 and supplied to the amplifier 35. The amplifier 35 operates for only the burst signal. The amplified output is transmitted to the 378 $f_H$ VCO 25 through the loop filter 36 and adder 27. An output of the VCO 25 is frequency divided into the frequency of 47.25 $f_H$ by the ½ frequency dividing circuit 28 and ¼ frequency dividing circuit 29. The change-over selecting circuit 30 selects four outputs (whose phases differ by 90° from each other) of the ¼ frequency dividing circuit 29 in accordance with a predetermined order. The selecting circuit 30 selects a certain single phase output when the track from which the recorded signal is being reproduced in response to an $f_H$ pulse from the terminal 33 and a head switching pulse from a terminal 34 is the track of CH$_1$ (channel 1). On the other hand, when the track is the track of CH$_2$ (channel 2), the selecting circuit 30 functions so as to change the phase by 180° at every horizontal period. Such a selecting method corresponds to what is called a phase inverting (PI) system to eliminate the adjacent crosstalk. The LPFs 31 and 32 are provided to eliminate the unnecessary frequency components and their outputs are supplied to the converters 5 and 6. Therefore, in this loop, the converter 5 operates as a phase detecting circuit and functions as a phase locked loop (PLL). That is, when the average level of the burst signal portion of the amplifier 35 is set to zero for a reference voltage, the VCO 25 oscillates at a center frequency of about 378 $f_H$. Therefore, it will be understood that between the carrier $\phi_1$ and the input signal to the converter 5, there is such a phase relation that the phase of the carrier $\phi_1$ is shifted by 90° from that of the input burst signal. In other words, when the converter 5 is regarded as a demodulator, the R-Y time base demodulation has been performed. The carrier $\phi_2$ is generated by the selecting circuit 30 so as to always keep the phase relation of 90° for the carrier $\phi_1$, so that the converter 6 operates so as to execute the B-Y time base demodulation.

The frequency discriminator 26 prevents the side lock (a phenomenon such that the signal is pulled in by a frequency which is away from the normal frequency by integer times of the frequency $f_H$ and this phenomenon occurs because the burst signal is the intermittent signal) of the PLL circuit. For instance, the frequency discriminator 26 generates an output signal such that the output frequency of the 378 $f_H$ VCO 25 does not exceed a range of $(378\pm2)f_H$.

An output of the amplifier 37 is generally set to a predetermined DC level to a reference voltage in response to the burst signal. On the other hand, in the case where a video signal in the black and white mode is input, the output of the amplifier 37 is set to zero as an average for the reference voltage. Due to this, it is determined whether the input signal is in the color mode or the black and white mode, thereby making the chroma killer 18 operate through the smoothing circuit 38. That is, in the black and white mode, the chroma signal is cut off by the chroma killer 18 so as to prevent the generation of the unnecessary noise.

The LPFs 7 and 8 have pass bands of about 0 to 500 kHz, so that only the R-Y signal and B-Y signal in the base band are selectively filtered, respectively. The 1 H delay circuit 9 and adder 11, likewise, the delay circuit 10 and adder 12 construct comb-shaped filters to suppress the adjacent crosstalk. Outputs of these filters are supplied to the noise canceller circuits 13 and 14. Further, output signals of the noise canceller circuits 13 and 14 are modulated by the converters 15 and 16 by the carriers from the $f_{sc}$ oscillator 23 and +90° phase shifting circuit 24, respectively. The original chroma signal of the NTSC system is derived by adding the modulated output signals by the adder 17. The chroma signal is added to the reproduction luminance signal from the luminance reproduction processing circuit 19 by the adder 20, so that a reproduction video signal is derived at the output terminal 21.

By the operations as described above, the R-Y signal and B-Y signal in the base band from which the frequency fluctuations were eliminated are obtained. By supplying these signals to the comb-shaped filters, the adjacent crosstalk component can be effectively eliminated and the high picture quality can be realized.

Figure 2:
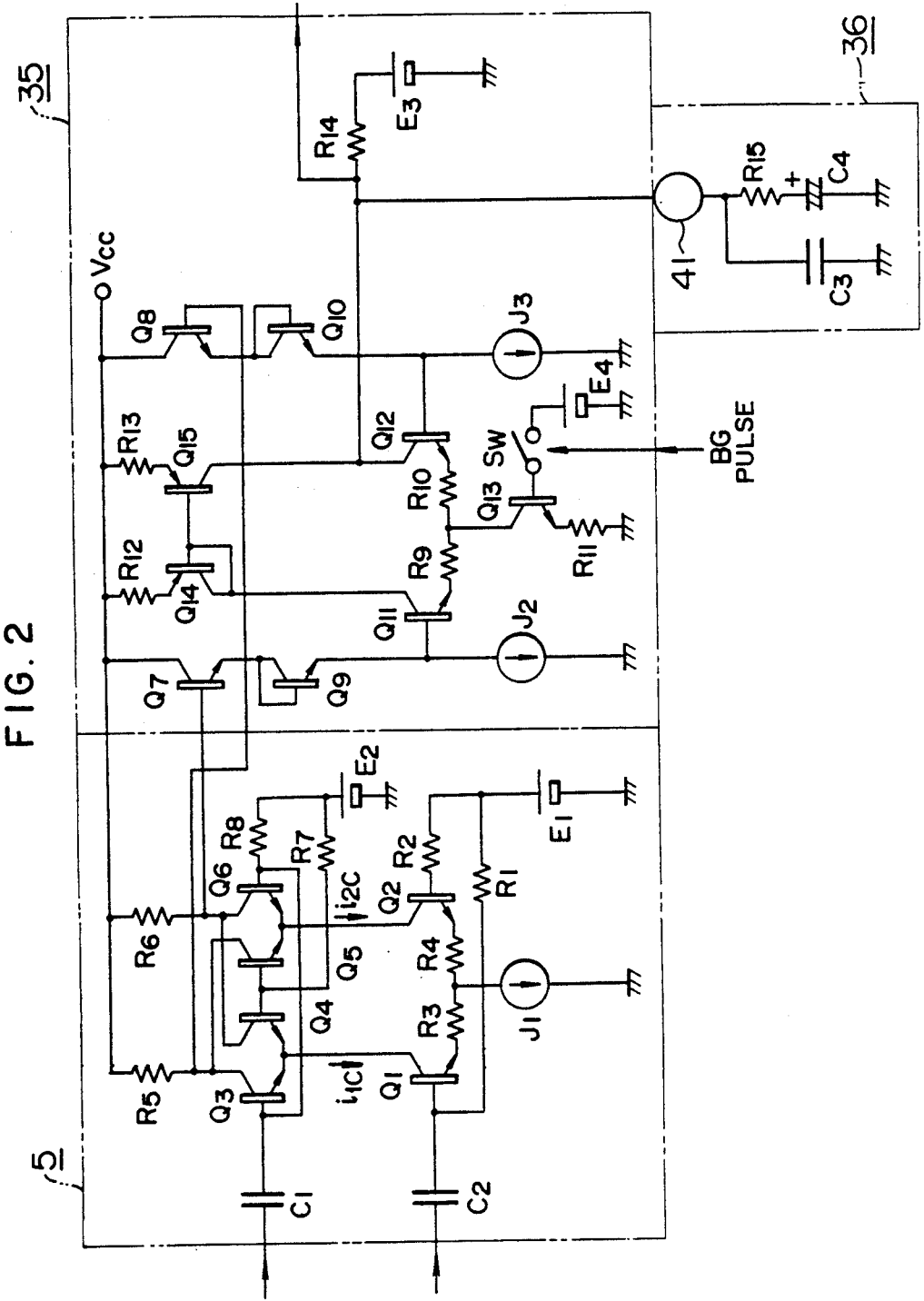
FIG. 2 is a circuit diagram showing a practical example of a converter, an amplifier, and a loop filter shown in FIG. 1.

FIG. 2 is a circuit diagram showing a practical example of the converter 5, amplifier 35, and loop filter 36 in FIG. 1. In FIG. 2, the same parts and components as those in FIG. 1 are designated by the same reference numerals. Further, reference numeral 41 denotes a pin of an integrated circuit; $C_1$ to $C_4$ indicate capacitors; $E_1$ to $E_4$ voltage sources; $J_1$ to $J_3$ current sources; $Q_1$ to $Q_{15}$ transistors; $R_1$ to $R_{15}$ resistors; and $S_w$ a switch.

Input signals (from the capacitor $C_2$) to the differential pair of transistors $Q_1$ and $Q_2$ correspond to the output signal (low frequency conversion chroma signal) of the burst deemphasis circuit 4 in FIG. 1. Input signals to the differential pair of transistors $Q_3$ and $Q_4$ and to the differential pair of transistors $Q_5$ and $Q_6$ (from the capacitor $C_1$) correspond to the output signal (conversion carrier) of the LPF 31. The low frequency conversion chroma signal is converted into the current signal by the differential pair of transistors $Q_1$ and $Q_2$ and used as a collector current, respectively. Collector currents $i_{1c}$ and $i_{2c}$ of the differential pair $Q_1$ and $Q_2$ are switched at the frequency of the conversion carrier by the differential pair $Q_3$ and $Q_4$ and the differential pair $Q_5$ and $Q_6$. The sum frequency component and the difference frequency component (R-Y component in the base band) of the two input signals are generated as voltages across the resistors $R_5$ and $R_6$, respectively. Although the phases of the voltages across the resistors $R_5$ and $R_6$ are opposite, these voltages are supplied to the transistors $Q_7$ and $Q_9$ and to the transistors $Q_8$ and $Q_{10}$ and are, further, amplified by the differential pair $Q_{11}$ and $Q_{12}$ and the current mirror circuit of $Q_{14}$ and $Q_{15}$.

The switch $S_w$, transistor $Q_{13}$, voltage source $E_4$, and resistor $R_{11}$ are provided for allowing the amplifying operation to be executed for only a burst gate signal period. The amplified output is generated as a voltage across the resistor $R_{14}$ for the reference voltage source $E_3$. The resistor $R_{15}$ and capacitors $C_3$ and $C_4$ construct a low pass filter to eliminate the high frequency component in the amplified output.

Figure 3:
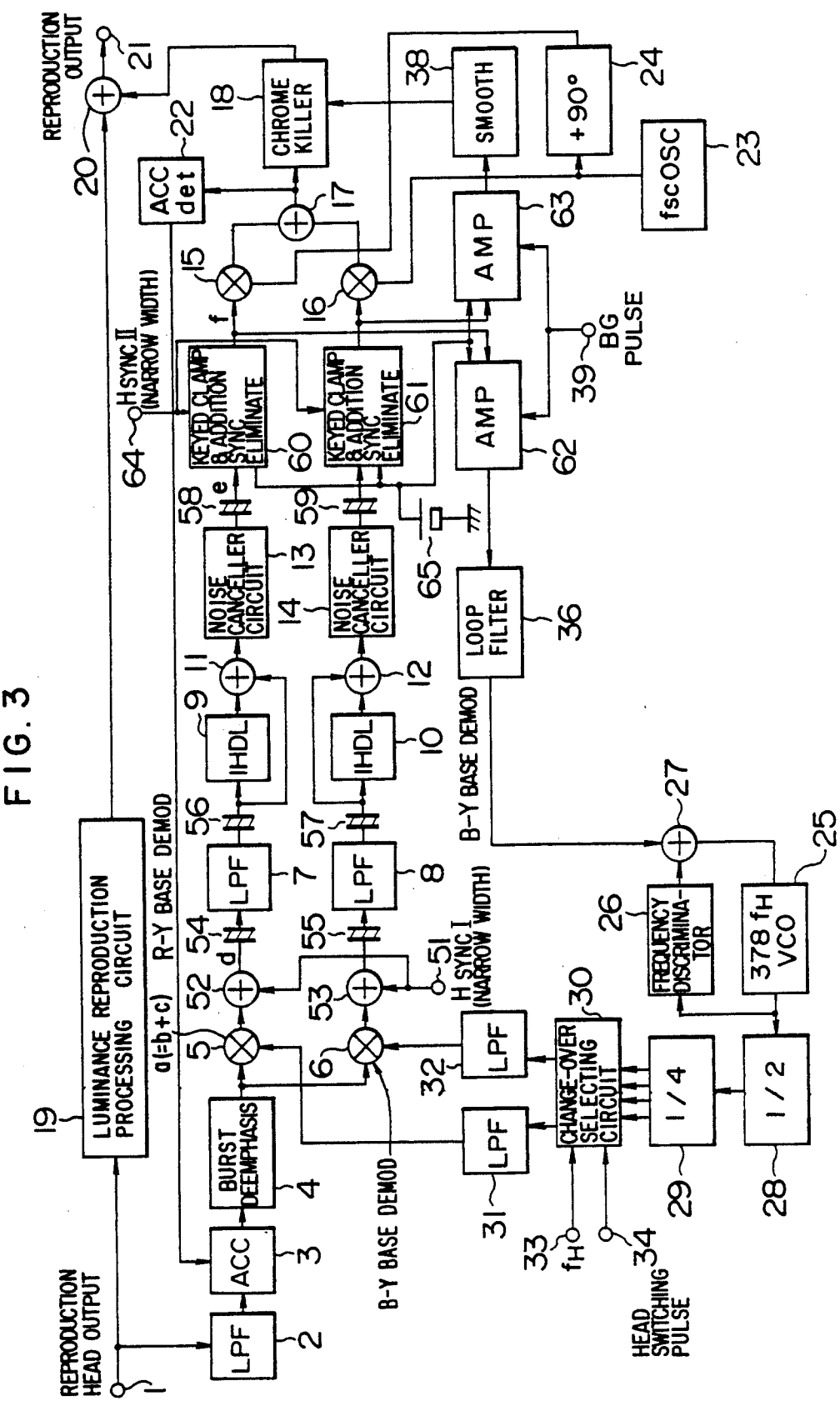
FIG. 3 is a block diagram showing another embodiment of a magnetic recording and reproducing apparatus according to the invention.

FIG. 3 shows the second embodiment of a magnetic recording and reproducing apparatus according to the invention different from FIG. 1. In FIG. 3, the same parts and components as those shown in FIGS. 1 and 2 are designated by the same reference numerals and their descriptions are omitted here. Reference numeral 51 denotes an input terminal of an H sync signal (hereinafter, referred to as an H sync; a width and a timing of the H sync will be explained hereinlater); 52 and 53 indicate H sync adding circuits; 54, 55, 56, 57, 58, and 59 are capacitors; 60 and 61 are circuits for performing a keyed clamping operation to set the signal levels in those portions to predetermined DC level and for eliminating the added sync (hereinafter, these circuits are simply referred to as keyed clamp circuits); 62 and 63 amplifiers; 64 an input terminal of the H sync (whose width and timing will be explained hereinafter); and 65 a voltage source.

It is a feature of the second embodiment that the PLL (phase locked loop) of the APC (automatic phase control) circuit is made operative at the post stage of the comb-shaped filter, that is, by the signal from which the adjacent crosstalk component was eliminated. Thus, it is possible to perform the further reliable PLL operation which is not influenced by the adjacent crosstalk component. The residual time base fluctuation component of the reproduction chroma signal can be further reduced.

The second embodiment shown in FIG. 3 mainly differs from the first embodiment shown in FIG. 1 with respect to a point that the H sync is added to the demodulated R-Y and B-Y signals by the adders 52 and 53. This is because there occur inconveniences such that, as mentioned above, the outputs of the converters 5 and 6 include the adjacent crosstalk components, and the front and post stages of the LPFs 7 and 8 are actually coupled by the capacitors 54, 55, 56, and 57, so that the H blanking level is not set to a reference level due to the adjacent crosstalk and the DC component is lost; therefore, the lost DC component is compensated, the DC reference is added, and the tip levels are aligned.

FIG. 4 is an explanatory waveform diagram in each section shown in FIG. 3. In FIG. 4, a waveform a corresponds to the output (the sum frequency component is omitted here) of the converter 5 shown in FIG. 3 and is not at the zero level due to the adjacent crosstalks for the H blanking period (including the H sync period). A waveform b corresponds to the main signal component included in the waveform a and is set to the zero level for the H sync period. A waveform c corresponds to the adjacent crosstalk component included in the waveform a. Obviously, $b+c=a$. The adder 52 shown in FIG. 3 adds the H sync to the waveform a in FIG. 4 and outputs a waveform d.

The level at the tip of the H sync is used as a temporary reference level at the post stage. For instance, when the 1 H delay lines 9 and 10 consist of CCDs (charge coupled devices) or the like, such a level can be set to a reference for its auto bias circuit. The addition sync (referred to as an H sync I) is set to a width which is about half of the inherent sync period (a timing of the former half in the example of FIG. 4) because of reasons which will be explained hereinlater.

The waveform d in FIG. 4 is transmitted through the comb-shaped filter, so that the adjacent crosstalk shown by the waveform c are eliminated and the resultant waveform is set to the zero level for the H blanking period excluding the addition sync as shown by a waveform $e (=d-c)$. Therefore, the keyed clamping operation is executed by a pulse (referred to as an H sync II) for the H blanking period at a timing different from the addition sync (H sync I) by the keyed clamp circuits 60 and 61. At this time, the addition sync (H sync I) is eliminated and the signal level is set to the clamp level. Due to this, the lost DC component is compensated and supplied to the converters 15 and 16.

That is, the signal such that the adjacent crosstalk component was eliminated, the H blanking level is set to zero, and the DC component was compensated is input to the converter 15 as shown at f in FIG. 4.

The voltage source 65 is provided as a reference voltage source for the keyed clamping operation. The voltage source 65 is also used to input a reference voltage source to the amplifiers 62 and 63. Therefore, the APC (automatic phase control) operation is executed so as to set the burst portion of the R-Y component to zero for the reference. Thus, the APC operation can be executed without being influenced by the adjacent crosstalk component and the residual time base fluctuation component can be further reduced as compared with the first embodiment shown in FIG. 1.

According to the invention, the reproduction low frequency conversion chroma signal is converted into the signal in the base band and the crosstalk component from the adjacent track can be eliminated by the comb-shaped filter. The burst signal portion of the R-Y component in the base band chrominance signal is supplied as a frequency control input signal to the original oscillator to generate the conversion carriers. Thus, the residual time base fluctuation component can be suppressed and an excellent advantage such that the high picture quality can be realized is obtained.

What is claimed is:

1. A video signal reproducing apparatus for reproducing a frequency-modulated luminance signal and a down-covered chrominance signal comprising:

carrier generating means for generating a carrier wave having a lower frequency than that of a color subcarrier of a color video signal;

multiplication means for demodulating a reproduced down-converted chrominance signal and for providing R-Y and B-Y chrominance component output signals in a baseband;

comb-shaped filter means for filtering said output signals of said multiplication means to suppress crosstalk components;

phase control means for comparing a burst level of said R-Y chrominance component signal and a reference value to control a phase of said carrier wave.

2. A video signal reproducing apparatus according to claim 1, wherein said phase control means receives said R-Y chrominance component signal having a burst level from said multiplication means.

3. A video signal reproducing apparatus according to claim 1, wherein said phase control means receives said R-Y chrominance component signal having a burst level from said comb-shaped filter means.

4. A video signal reproducing apparatus according to claim 1, further comprising noise canceller means for enabling cancellation of noise in said R-Y and B-Y chrominance component signals filtered by said comb-shaped filter means so as to improve a signal to noise ratio of said R-Y and B-Y chrominance component signals.

5. A video signal reproducing apparatus according to claim 4, further comprising H sync adding means for adding a H sync signal to said R-Y and B-Y chrominance component signals so as to compensate for a DC component.

6. A video signal reproducing apparatus according to claim 1, further comprising means for utilizing the filtered output signals from said comb-shaped filter means for reproduction.

7. A video signal reproducing apparatus according to claim 1, further comprising H sync adding means for adding a H sync signal to said R-Y and B-Y chrominance component signals so as to compensate for a DC component.

8. A video signal reproducing apparatus according to claim 1, wherein said carrier generating means includes a first carrier generating means for generating a first carrier wave having a lower frequency than that of the color subcarrier of the color video signal, and second carrier generating means for generating a second carrier wave having a frequency equal to that of the color subcarrier of the color video signal.

9. A video signal reproducing apparatus according to claim 8, further comprising converter means for modulating said second carrier wave with said R-Y and B-Y chrominance component signals from said comb-shaped filter means to enable generation of the chrominance signal of the color video signal.

10. A video signal reproducing apparatus according to claim 8, further comprising noise canceller means for enabling cancellation of noise in said R-Y and B-Y chrominance component signals from said comb-shaped filter means so as to improve a signal to noise ratio of said R-Y and B-Y chrominance component signals; and converter means for modulating said second carrier wave with said R-Y and B-Y chrominance component signals from said noise canceller means so as to enable generation of the chrominance signal of the color video signal.

\* \* \* \* \*